Dec. 22, 1959  J. F. NELSON ET AL  2,918,177
ROTARY BUNDLE RACK
Original Filed Jan. 11, 1955  2 Sheets-Sheet 1
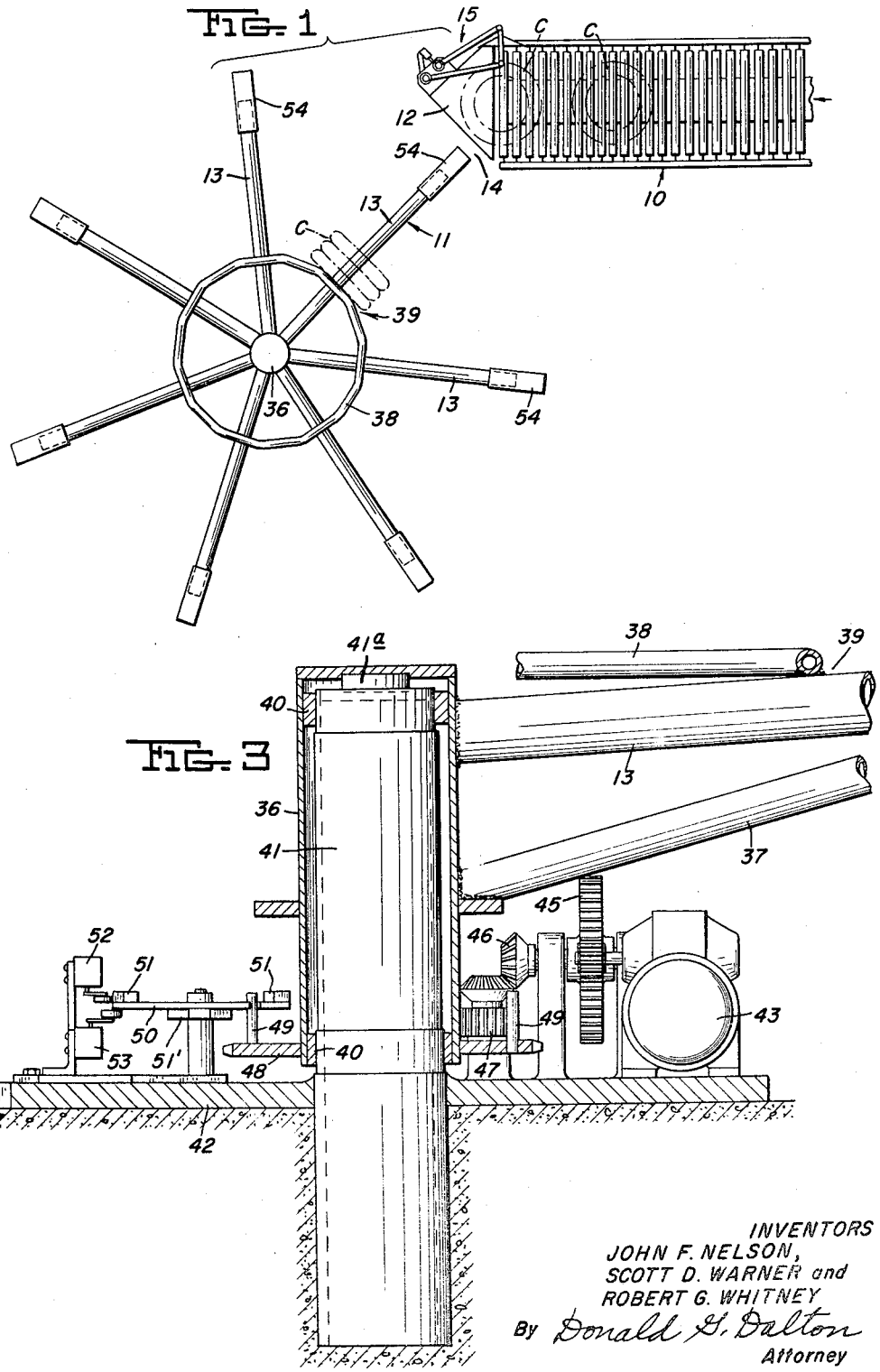
INVENTORS
JOHN F. NELSON,
SCOTT D. WARNER and
ROBERT G. WHITNEY
By Donald G. Dalton
Attorney

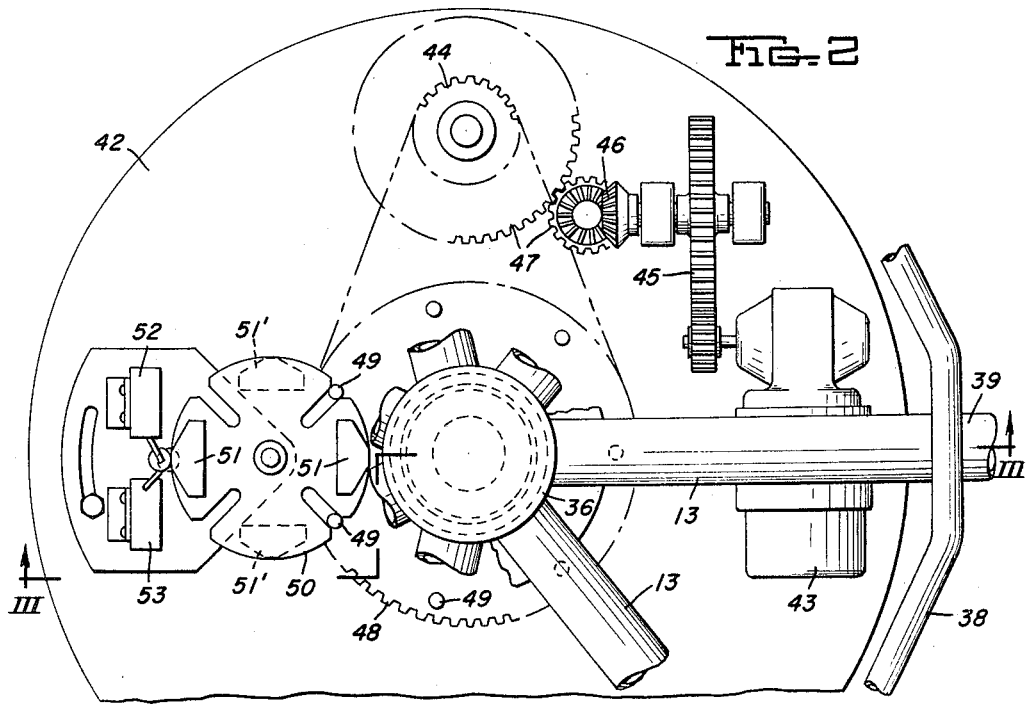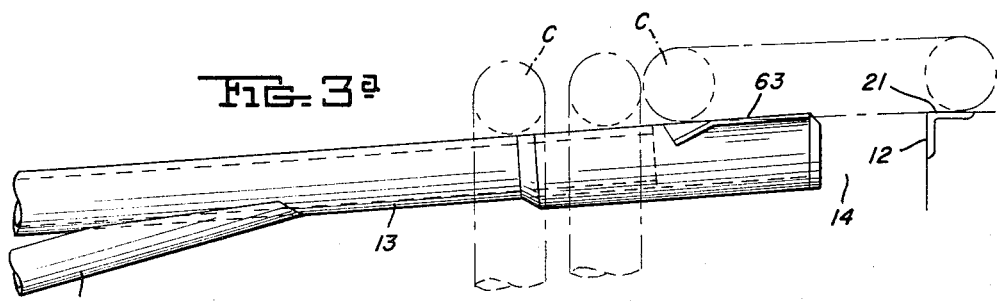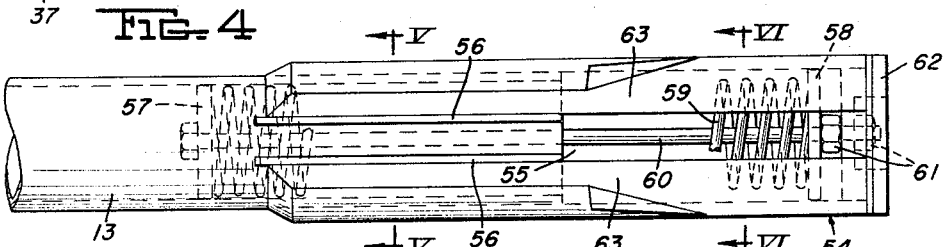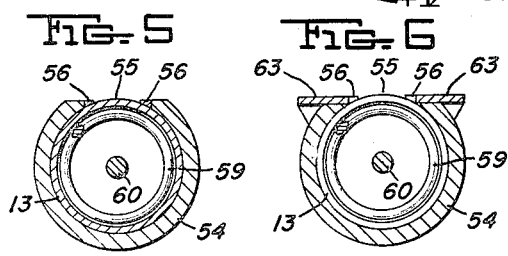
INVENTORS
JOHN F. NELSON,
SCOTT D. WARNER and
ROBERT G. WHITNEY
By Donald G. Dalton
Attorney

United States Patent Office 2,918,177
Patented Dec. 22, 1959

2,918,177
ROTARY BUNDLE RACK

John F. Nelson, Concord, Scott D. Warner, Pittsburg, and Robert G. Whitney, Concord, Calif., assignors to United States Steel Corporation, a corporation of New Jersey Original application January 11, 1955, Serial No. 481,054, now Patent No. 2,869,738, dated January 20, 1959. Divided and this application May 16, 1957, Serial No. 659,591

6 Claims. (Cl. 211—163)

This invention relates generally to apparatus for supporting annular articles and, in particular, to means for receiving such articles from a horizontal position lying on a conveyor, when transposed to a vertical position, and suspending them from a cantilever supporting arm, in order to facilitate the pick-up of a group of articles by a ram-lift truck for transport.

This is a division from our application, Serial No. 481,054, filed January 11, 1955, now United States Patent No. 2,869,738, dated January 20, 1959.

Various articles in the form of an annulus require handling in groups as an incident to their manufacture or shipment. One example is the coils or bundles into which wire is formed by winding on drawing blocks. Such coils are usually placed on a conveyor with their axes vertical and strapped or tied at a plurality of points around their circumference to compact the turns of the coil and form a bundle which can readily be handled. It has been the practice heretofore to lift the tied coils by hand from the conveyor and stand them on edge in a row on the floor for pick-up by a ram-lift truck and movement to storage or a shipping conveyance.

We have invented novel apparatus for performing this function, including mechanical means for removing coils from a conveyor and a cantilever supporting arm cooperating therewith in gathering a plurality of coils in alinement so that they may be picked up therefrom together. The arm is one of a plurality radiating from a common center in the form of a rotary spider or coil rack, each arm of which is adapted successively to receive a group of coils from the conveyor. A slide table extends from the conveyor toward one of the spider arms but is spaced from the path of the ends of the arms. A coil pusher is mounted for oscillation forth and back over the table to move coils successively from the conveyor onto one of the arms. The arms are provided with telescoping extensions at their outer ends and a coil stop adjacent their inner ends. The structure of the coil rack is the invention claimed herein.

A complete understanding of the invention may be obtained from the following detailed description and explanation which refer to the accompanying drawings illustrating the present preferred embodiment. In the drawings:

Figure 1 is a plan view showing the conveyor, slide table, coil pusher and spider, certain parts being omitted;

Figure 2 is a plan view of the spider with parts omitted for clearness;

Figure 3 is a section, with parts in elevation, taken along the plane of line III—III of Figure 2;

Figure 3a shows the outermost end of one of the arms in elevation;

Figure 4 is a partial plan view to enlarged scale showing the telescoping extension at the end of the spider arms; and Figures 5 and 6 are sections therethrough taken, respectively, along the lines V—V and VI—VI of Figure 4.

Referring now in detail to the drawings and, for the present, to Figure 1, a roller conveyor 10 delivers tied coils of wire in the direction of the arrow. A spider or coil rack 11 having arms 13 adapted to receive the coils and gather them in groups, is offset from the longitudinal axis of the conveyor. A slide table 12 extends from the discharge end of the conveyor toward the spider but is spaced from the path of the ends of the arms 13 of the spider by a gap 14. A pusher 15 serves to transpose the coils C successively from the conveyor, across the table and onto a spider arm in a manner which will be explained in more detail later.

Referring now more particularly to Figures 2, 3 and 3a, the arms 13 of spider 11 are pipe lengths constituting cantilevers extending radially from a cylindrical sleeve or hub 36. The arms are generally horizontal but slope downwardly from their outer ends which are flush with table top 21, toward the hub, and are braced by struts 37. A pipe loop 38 coaxial with the hub is carried by arms 13 and serves as a stop for coils placed thereon and sliding downwardly to the position indicated at 39. The hub 36 is journaled on vertically spaced radial bearings 40 carried by a cylindrical post 41 fixed centrally of a base plate 42 and extending upwardly and downwardly therefrom. A thrust bearing 41a disposed on top of the post is engaged by the upper end of the hub.

Spider 11 is driven step-by-step to bring successive or alternate arms 13 into a position adjacent table 12 as shown in Figure 1. A gear motor 43 drives a sprocket 44 journaled on a stub shaft upstanding vertically from plate 42, through spur gears 45, bevel gears 46 and spur gears 47. These gears are mounted on shafts journaled in bearings carried by plate 42. Sprocket 44 drives a chain trained around it and a sprocket 48 fixed to the lower end of hub 36. Sprocket 48 has vertical pins 49 spaced circumferentially thereof adapted to actuate a Geneva disc 50 journaled on a stub shaft upstanding from plate 42. Disc 50 has cam blocks 51 and 51' thereon adapted to actuate limit switches 52 and 53 controlling gear motor 43.

Each arm 13 has an extension 54 slidable on the outer end thereof. In the illustrated embodiment, these extensions are sleeves telescoped on the pipe lengths of which arms 13 are composed. Each of the sleeves has a longitudinal slot 55 therethrough and ribs 56 of metal are deposited on the arms adjacent the sides of the slots, forming splines which prevent rotation of the sleeves yet permit sliding movement thereof along the arms. An abutment disc 57 is fixed in each arm at a point inwardly from the end thereof. A similar disc 58 is loose in each sleeve 54 adjacent the outer end thereof. A coil spring 59 is compressed between the discs and tends to move the sleeve outwardly of the arm to the extent permitted by a through bolt 60 the head of which bears on disc 57. The threaded end of the bolt is secured by nuts 61 to a plug disc 62 fixed in the end of the sleeve.

Flat bars 63 extend along the edges of the slots 55, partway of the length of sleeves 54, to provide an extended area of contact with the leading side of the coils as they are pushed across table 12 toward one of the arms 13.

It will be apparent from the foregoing that coils advancing along conveyor 10 ultimately reach a position in which they are engageable by pusher 15. By properly timing the operation of the pusher, coils arriving at such position are successively pushed from the conveyor across table 12. The leading side of each coil is supported as a cantilever as it crosses gap 14 (see Figure 3a), being overbalanced by the greater weight of the portion of the coil remaining in contact with the table top. When the trailing side of a coil reaches the gap, however, it falls therethrough and the coil thereby becomes suspended on the arm and is pushed therealong toward stop 38 as subsequent coils are placed on the arm.

When one arm 13 is loaded to capacity with coils, spider 11 is rotated until the next arm or the next but one is adjacent table 12. Since there is an odd number of arms 13, indexing the spider through the angle between alternate arms will require two complete revolutions of the spider before all the arms have been loaded. If the spider is indexed through only the angle between adjacent arms, all the arms will have been loaded when a single revolution of the spider has been effected. The former affords better balancing of the spider when loaded.

A group of coils placed on one of the arms 13 as explained above, may be removed by a ram-lift truck at any point about the circumference of the spider. To this end, the truck is operated to cause its ram to penetrate the eyes of the coils. Since the ram length is only slightly greater than the total length of the group of coils, the truck must be advanced to engage and retract extension sleeve 54 along the arm until spring 59 goes solid. When the truck ram is then raised to lift the group of coils and backed away, the spring advances the extension immediately to normal position.

It will be apparent from the foregoing that the invention provides a simple yet efficient and easily operable means for gathering a load of wire coils or bundles and holding them in position to be readily picked up by a ram-lift truck. Manual handling of the coils is eliminated and ample reserve coil-holding capacity is provided.

Although we have disclosed herein the preferred embodiment of our invention, we intend to cover as well any change or modification therein which may be made without departing from the spirit and scope of the invention.

We claim:

1. A rack for holding annular articles comprising a base plate, a post extending vertically upward from said plate, radial bearings on said post adjacent its top and adjacent said plate, a cylindrical sleeve fitting over and enclosing said post and journaled on said bearings, a thrust bearing between the top of the post and the upper end of the sleeve, a plurality of radial cantilever arms extending outwardly from said sleeve, each arm having a retractable extension member at its outer end and means constantly urging said extension members outwardly on their arms.

2. Apparatus as defined in claim 1, characterized by said arms being tubular and said extension members being cylindrical and telescoped onto the ends of the arms.

3. Apparatus as defined in claim 1, characterized by said extension members being splined to said arms.

4. Apparatus as defined in claim 1, characterized by said extension members having a flat bearing surface on the upper side thereof.

5. Apparatus as defined in claim 1, characterized by each extension member having a longitudinal slot therethrough and each arm having a longitudinal rib on its periphery adapted to enter the slot of the extension member when the latter is telescoped thereon.

6. Apparatus as defined in claim 1, characterized by a transverse plate fixed in each arm inwardly of the outer end thereof, a bolt slidable through said plate and fixed to the extension member of each arm and a spring compressed between the plate and the extension member of each arm.

References Cited in the file of this patent

UNITED STATES PATENTS

| | | |
|---|---|---|
| 446,362 | Newman | Feb. 10, 1891 |
| 1,169,954 | Halliday | Feb. 1, 1916 |
| 1,433,642 | Olson | Oct. 31, 1922 |
| 1,660,973 | Oestreicher | Feb. 28, 1928 |
| 1,729,004 | Miadowicz | Sept. 24, 1929 |
| 1,790,338 | Chartoff | Jan. 27, 1931 |
| 2,382,249 | Megar | Aug. 14, 1945 |